United States Patent [19]
Onandia-Alberdi

[11] Patent Number: 5,293,022
[45] Date of Patent: Mar. 8, 1994

[54] SPARK EROSION MACHINE

[75] Inventor: Carmelo Onandia-Alberdi, Durango, Spain

[73] Assignee: Ona Electro-Erosion, S.A., Spain

[21] Appl. No.: 964,721

[22] Filed: Oct. 22, 1992

[30] Foreign Application Priority Data

Nov. 4, 1991 [ES] Spain .................. 9103267[U]

[51] Int. Cl.$^5$ .................. B23H 7/00; B23H 7/26
[52] U.S. Cl. .................. 219/69.11; 219/69.14; 219/69.15
[58] Field of Search ............. 219/69.11, 69.15, 69.1, 219/69.14; 204/224 M

[56] References Cited

U.S. PATENT DOCUMENTS

| 4,764,653 | 8/1988 | Bühler | 219/69.15 |
| 5,075,530 | 12/1991 | Lee | 219/69.11 |

FOREIGN PATENT DOCUMENTS

| 64-16320 | 1/1989 | Japan | 219/69.11 |
| 1-274924 | 11/1989 | Japan . | |
| 539371 | 1/1985 | Spain . | |
| 539372 | 1/1985 | Spain . | |
| 8700408 | 2/1987 | Spain . | |
| 8702267 | 7/1987 | Spain . | |
| 8702268 | 7/1987 | Spain . | |

*Primary Examiner*—Geoffrey S. Evans
*Attorney, Agent, or Firm*—Lucas & Just

[57] ABSTRACT

A spark erosion machine that includes two independently driven portals, each portal mounted on a portal carrier and bearing a header holding an electrode. The machine also has segmented container with a removable inner door separating two subcontainers and side walls forming hermetically sealable access doors.

4 Claims, 1 Drawing Sheet

SPARK EROSION MACHINE

This invention concerns a structure for a machine-tool, more particularly for a spark-erosion machine.

Machine-tools are at present known using spark-erosion technique for machining. These machines replace the conventional machine-bed by a container containing di-electric liquid in which are arranged the components to be machined and the tools for machining by electrodes.

On that basis, the applicant is the holder of registered rights incorporating new technology in this industrial field of spark-erosion machine-tools. Spanish Patent 8702268 may be quoted as an example, relating to a portal structure for this type of machine, Spanish patents 8702267 and 8700408, relating respectively to a system for cleaning the filter and the di-electric liquid; also Spanish patents 539,371 and 539,372 relating to electronic control systems for a penetration spark-erosion machine.

The appropriate technical requirements are such that normal machine structures have become outmoded and unviable, although the technologies in use remain technically very valid.

Where for instance there is a need to machine small configurations in large components, the said small configurations being very distant from each other, the spark-erosion process can prove effective, but it is not viable since it is necessary to use under-utilised high technology machines successively to achieve small operations, with extensive operational times (minimum yield).

The present invention provides for a new machine-tool structure, particularly a spark-erosion machine tool, consisting of:

a) at least two portals driven in an independent manner, each portal being mounted on a portal-carriage and bearing the upper part moving along axis O:X in relation to the portal and the assembly being movable along O:Y in relation to the machine-bed;

b) a machine-bed structured to form a sump or container, with one side wall at least or both forming side-access doors sealing hermetically in the locked position in order to form a working container.

In addition it is further characterised in that the sump has at least a guillotine-type or similar inner door, so as to demarcate between the door(s) and the side-walls of the sump a set of independent containers with one for each working portal.

With this, it is possible to machine large-volume components, producing various and small configurations, at a distance from each other, resulting in appreciably reduced machining-times.

Using the spark-erosion process it is also possible to machine components just as on conventional machine-tools, with the additional advantage of grouping together the production from various machines, with the maintenance costs (space needed, cleaning filters, etc.) for a single machine.

Figure 1:
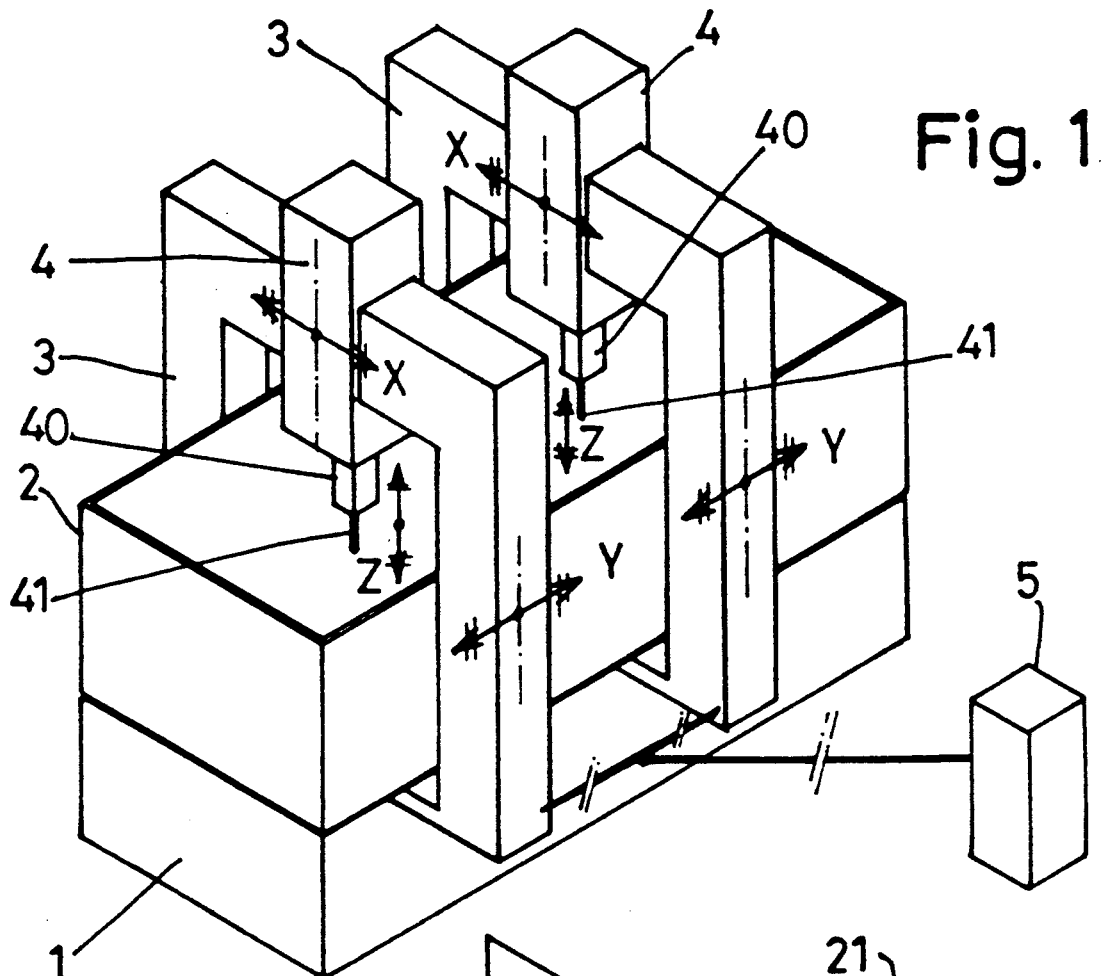
FIG. 1 shows a general perspective diagrammatic view of a machine tool-structure, particularly a spark-erosion machine-tool according to the invention.
Figure 2:
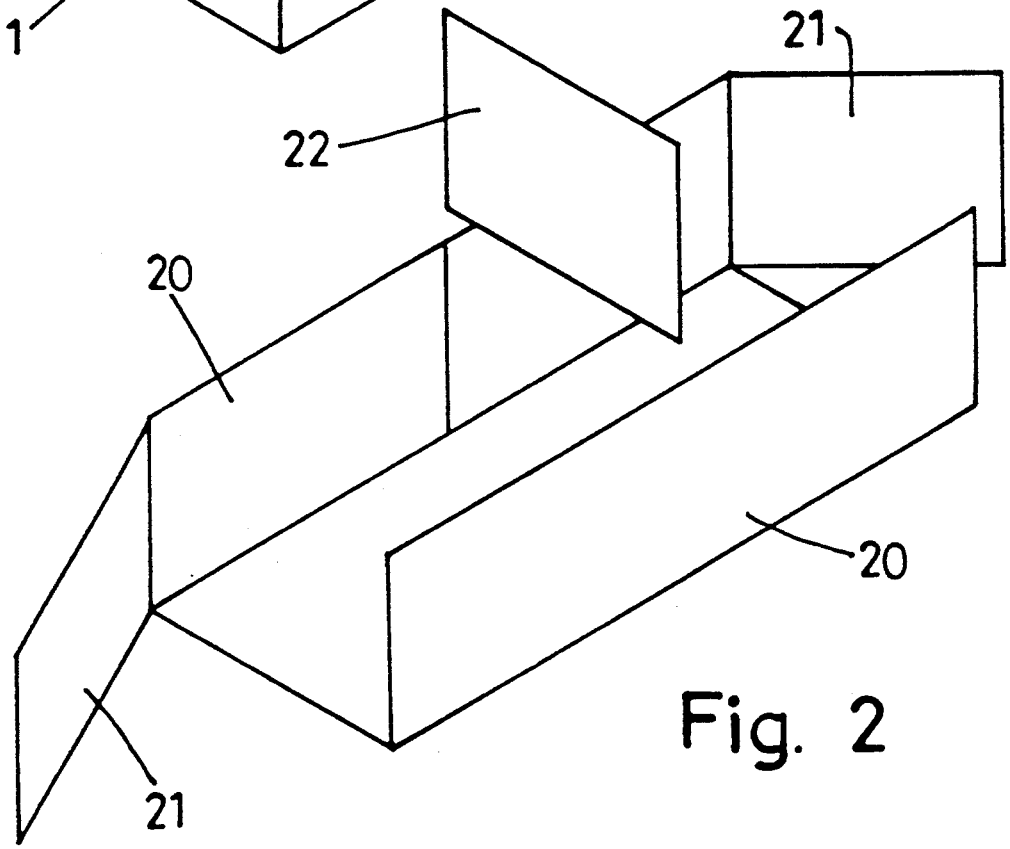
FIG. 2 shows a perspective diagrammatic view of the machine-bed sump (2) as an assembly, with its side doors (21) open and an inner guillotine door (22).

Following the invention and the example shown here, the machine tool-structure, particularly a spark-erosion machine-tool, consists according to the invention of:

a base (1);
a sump or container (2)
at least two carrier-portals (3) each bearing a header (4);
one (or several) drive units (5) for moving the portals (3).

Each portal (3) bears a header carrier (4) moving along axis O:X within the portal (3).

Each header carrier (4) bears a header (40) with a corresponding electrode-carrier (41), the header (40) and the carrier electrode (41) moving along axis O:Z of the header carrier (4).

Each portal (3) moves along axis O:Y in relation to the container (2), by means of the corresponding drive unit (5). The movement is independent for each portal (3); there are as many drive units (5) as there are portals (3), or a same drive unit (5) is able to move the portals (3) independently.

The machine sump (2) arrangement itself consists of at least one of its side walls (21) forming a door, the other walls (20) remaining fixed. The assembly is fitted to the fixed framework (1) of the machine-tool.

The side door (21), or each existing door comprises:
means for opening/hermetically sealing in relation to the remainder of the machine-sump (20);
means to ensure the mutual hermetic seal between the door (21) and the machine-sump (20) in the closed position. The said means are manual or automatic.

Each door (21) is able to swing or move in a guided and linear manner, in ascending/descending manner or transversely between the two open and closed end positions.

This arrangement of the side-doors (21) allowing them to be opened, facilitates the entrance/departure of the pallets bearing components for machining and machined components.

An intermediate and detachable wall (22) is also provided to allow the use of the sump and consequently of the machine for two independent components requiring differing machining or treatment.

What is claimed is:

1. A spark-erosion machine comprising:
(a) at least two portals, each portal comprising a bottom piece, two legs and a top piece;
(b) each said portal being driven independently of another portal, and each said portal being movable in the Y direction;
(c) a header carrier mounted on the top piece of each said portal, each said header carrier being movable in the X direction;
(d) a header with an electrode being mounted on each said header carrier, each said electrode being movable in the Z direction;
(e) a machine bed which forms a container, said container having a front wall, a back wall and side walls at each end, at least one of said side walls forming an access door having locked and open positions, said access door being hermetically sealed when in the locked position;
(f) at least one inner door in said container, said at least one inner door dividing said container into at least two subcontainers; and
(g) wherein at least one of said portals is positioned about one of the subcontainers and another of said portals is positioned about another one of said subcontainers.

2. The spark-erosion machine of claim 1 wherein there is one inner door which forms first and second subcontainers and wherein there are two portals, one said portal being positioned about the first subcontainer and the other said portal being positioned about said second subcontainer.

3. The spark-erosion machine of claim 1 wherein each side wall of said container forms an access door.

4. The spark-erosion machine of claim 1 wherein each said at least one inner door is detachable.

* * * * *